(12) United States Patent
Napiorkowski

(10) Patent No.: US 11,014,475 B2
(45) Date of Patent: May 25, 2021

(54) CHILD CAR SEAT

(71) Applicant: Stanislaw Napiorkowski, Warsaw (PL)

(72) Inventor: Stanislaw Napiorkowski, Warsaw (PL)

( * ) Notice: Subject to any disclaimer, the term of this patent is extended or adjusted under 35 U.S.C. 154(b) by 30 days.

(21) Appl. No.: 16/608,488

(22) PCT Filed: Apr. 26, 2018

(86) PCT No.: PCT/EP2018/060744
§ 371 (c)(1),
(2) Date: Oct. 25, 2019

(87) PCT Pub. No.: WO2018/197619
PCT Pub. Date: Nov. 1, 2018

(65) Prior Publication Data
US 2020/0189426 A1    Jun. 18, 2020

(30) Foreign Application Priority Data
Apr. 27, 2017 (PL) .................... 17461528.6

(51) Int. Cl.
*B60N 2/28* (2006.01)
*B62B 5/06* (2006.01)
*B62B 7/02* (2006.01)

(52) U.S. Cl.
CPC ......... *B60N 2/2845* (2013.01); *B60N 2/2848* (2013.01); *B62B 5/067* (2013.01); *B62B 7/02* (2013.01)

(58) Field of Classification Search
CPC ...... B60N 2/2845; B60N 2/2848; B62B 7/00; B62B 5/067
See application file for complete search history.

(56) References Cited

U.S. PATENT DOCUMENTS

| | | | |
|---|---|---|---|
| 3,116,089 A * | 12/1963 | Banzhaf | B62J 1/06 297/203 |
| 3,944,241 A * | 3/1976 | Epelbaum | B62B 7/12 280/30 |
| 4,570,956 A * | 2/1986 | Dyer | B62B 7/12 16/38 |
| 6,003,883 A * | 12/1999 | Brenneman | A47C 1/14 280/30 |
| 7,311,353 B1 | 12/2007 | Johnson | |
| 9,308,839 B1 | 4/2016 | Gleckler | |
| 2004/0239079 A1 * | 12/2004 | Bischoff | B60N 2/2821 280/658 |
| 2007/0278756 A1 | 12/2007 | Erskine | |
| 2010/0019547 A1 * | 1/2010 | Gray | B60N 2/2845 297/118 |
| 2012/0119457 A1 * | 5/2012 | Williams | B60N 2/2848 280/30 |

FOREIGN PATENT DOCUMENTS

| | | |
|---|---|---|
| CA | 2833830 A1 | 5/2015 |
| DE | 102012017590 A1 | 4/2014 |
| FR | 1488375 A | 7/1967 |
| GB | 2451830 A | 2/2009 |

* cited by examiner

*Primary Examiner* — John D Walters
*Assistant Examiner* — James J Triggs
(74) *Attorney, Agent, or Firm* — King & Schickli, PLLC

(57) ABSTRACT

It relates to a child car seat, and more particularly, to a child car seat equipped with wheels and a handle, which facilitates the guiding of the car seat with a single hand, in such a way that the child is rearward to the direction of the movement, facing the person guiding the car seat.

15 Claims, 8 Drawing Sheets

CHILD CAR SEAT

FIELD OF THE INVENTION

The invention relates to a child car seat, and more particularly, to the child car seat equipped with wheels and a handle, which facilitates guiding the car seat with a single hand, in such a way that the child is rearward to the direction of the movement and facing the person guiding the car seat.

BACKGROUND OF THE INVENTION

Child car seats and strollers are essential for transporting small children by various means of communication. Various constructions of this type are known.

For example, U.S. Pat. No. 9,308,839 B1 discloses a device combining functions of a car seat and a stroller. This device includes a fixed telescopic handle mounted on the back of the car seat backrest. The solution suggests pulling the stroller behind. Positioning of the wheels at the front of the seat makes it impossible during the normal use of this device to set position of the child facing the parent. Moreover, in such arrangement there is a risk of the child falling out of the car seat, and base part of the car seat can rub against the ground, if used carelessly.

Further, US 20040239079 A1 provides a similar solution to the one mentioned above, except that the wheels are mounted in the area of the rear wall and the car seat base joint.

Yet further, DE 102010005650 A1 shows a typical stroller having a single collapsible handle fixed in the front part of the seat and provided with a grip for guiding the stroller using one or both hands. The stroller is designed for pulling and the handle is mounted permanently at the front of the stroller, thereby clearly excluding the opportunity of using the stroller in a function of a child car seat.

Moreover, EP 2219932 B1 describes a variant of a car seat convertible to a stroller by mounting it on a rack having a large guiding handle and two axles fitted with wheels. Once the seat is mounted on the rack, a visual contact between the family member/caregiver guiding the stroller with the child in the seat is possible. The seat itself (i.e. the device used to transport a child in a vehicle) has neither wheels, nor a handle designed to guide (push) the child seat on the ground. Therefore, if the car seat is to be used as a stroller, it is necessary to combine it with the rack, which in turn requires additional considerable space to be provided in a vehicle for transporting purposes.

SUMMARY OF THE INVENTION

Most of the existing child car seat solutions require positioning the child backward to the parent, which poses a considerable problem in terms of safety and correct development of the child. It is a known fact that providing an arrangement wherein the child faces the parent not only provides adequate protection (e.g. allowing the parent to react immediately to any possible danger arising in close proximity of the child or respond quickly to her/his needs, but also to help maintain and develop stronger bonds between the child and parent, which is very important from a psychological point of view, in particular in early childhood.

Structures attempting to solve this problem involve the use of additional elements (e.g. racks, chassis), required to combine with the child car seat to a sort of a baby stroller. However, such additional elements are often of considerable size, weight and have dimensions and/or complexity far greater that the child car seat as such. Assembling and disassembling such multi-element car seats-strollers involves considerable time, effort and requires additional space in a vehicle. On the other hand, carrying a child in a typical car seat can be risky, because due to considerable weight the car seat with the child inside generally positioned low in a straight arm, i.e. near the ground. Similar risks are associated with child car seats pulled behind the parent—a dog can easily run up the seat, something ma fall into it, or the seat may wobble from side to side on an uneven surface. Therefore, providing a child car seat allowing to guide it in a stroller function with the child seated in the position facing the parent is essential for avoiding such risks.

Therefore, one of the aims of the present invention was to provide a child car seat having simple construction, easily convertible between a child car seat function and a stroller function and which would allow a parent to keep a constant visual contact with the child during at all times and thus increasing safe movement, in particular in crowded areas. A further aim of the invention was to provide a child car seat which could be guided using a handle of such shape and arrangement so as to provide the most anatomical position of the hand while guiding the seat. Yet further aim of the invention was to increase the comfort of both parent and child during all types of travel in a child car seat.

Accordingly, the invention relates to a child car seat comprising a housing surrounding a backrest and a seat, and a handle for guiding the car seat. The child car seat according to the invention comprises:

a) at least two wheels, each of them being mounted on an axle around which it can rotate, the axle extending at least partly through the car seat housing, b) the handle is elongated, mounted with one of its ends to the car seat, and provided at its another, free end with a grip for pushing the car seat in front of oneself on the ground, the handle being configured and located relative to the axle so that in normal use the centre of gravity of the car seat with a handle is located between the grip and the axle, whereby the handle is mounted to the car seat housing, either to the bottom part of the housing below the seat, further away from the backrest and directed in this direction, or to the part of the housing behind the backrest and directed in this direction.

Preferably, the handle is formed as a single stick-shaped element and is mounted to the seat of the car seat, from below, further away from the backrest and directed in this direction.

Preferably, the handle is connected to the car seat detachably, especially by snap-on, press fit, a thread or with an additional fastener such as a screw, bolt or pin.

Preferably, the handle is selected from a group comprising: a straight, uniform handle, preferably made of one piece of material; folding handle made of several segments, connected by a spring line placed inside; folding telescopic handle; folding unscrewing handle; handle extended from the inside of the seat housing; like in suitcases.

Preferably, the handle extends substantially perpendicular to the axle around which the wheels can rotate.

Preferably, wherein the grip extends substantially along the handle.

Preferably, the handle is movably mounted to the car seat housing, either to the bottom part of the housing below the seat, further away from the backrest and directed in this direction, or to the part of the housing behind the backrest and directed in this direction; and the handle is cambered and shaped to essentially correspond to a lateral side of the child seat; and the handle is movable between at least two end positions, in which it can be blocked: a guiding position, wherein the handle extends substantially perpendicular to the axis around which the wheels can rotate a tucked position, wherein the handle essentially surrounds one of the lateral sides of the child seat and at least partially the rear walls of the backrest of the seat.

Preferably, the handle, consisting of three parts: part (a) which is mounted to the car seat housing, part (b) which is the longest and unbent part of the handle and part (c) forming the grip of the handle, wherein (a) is connected to (c) via (b), is movable between three end positions in which it can be blocked: the guiding position, the tucked position and a shoulder position, wherein in the shoulder position part (b) of the handle is located in front of the user, so that part (c) surrounds the user's arm from the back to the front. These positions enable transporting the car seat through various places, such as crowded airport halls, staircases, etc.

Preferably, in the shoulder position the user is facing the child and is able to surround the lateral side of the car seat with her/his arm, so that the eye contact with the child is still provided. Surrounding the seat by the arm of the parent additionally stabilizes the car seat with the child, which makes the transport safer.

Preferably, the part (c) of the handle is directed downwards. Such arrangement allows to maintain comfortable posture of the parent or another person guiding the stroller, regardless of her/his height.

In one preferred embodiment, the handle is movably mounted to the car seat housing by means of a ball joint. The ball joint provides easy and smooth changing between said positions.

Preferably, the ball joint is arranged under the seat from the side farther away from the backrest or under the backrest.

Preferably, the handle is movable from one of the end positions to another by being rotated around the longitudinal axis of the handle and around the rotation axis of the ball joint.

Preferably, the ball joint is provided with a number of slits in the female part thereof corresponding to the number of end positions of the handle, and the handle is blocked in each of its end positions by being fixed in the corresponding slit of the ball joint female part.

In another preferred embodiment, the handle is movably mounted to the bottom part of the housing below the seat, further away from the backrest, by means of a rod-shaped intermediate element comprising two hinged connections on its both ends, one end being hingedly connected to the car seat housing and the other end being hingedly connected to the handle, whereby the rotation axis the two hinged connections are perpendicular to each other.

In yet another preferred embodiment, the handle is movably mounted to the bottom part of the housing below the seat, further away from the backrest, by means of at least one connecting element fixed to the housing and connected to the handle by a flexible tubular portion.

Preferably, the part (c) of the handle is provided with a short band, preferably equipped with a hook, wherein the hook is adjusted to engage a ring or other corresponding element arranged on the rear wall of the backrest, thereby blocking the handle in the tucked and shoulder positions, and the car seat is equipped with an element adjusted to receive the handle in part (a) and located near the element mounting the handle to the car seat, to block the handle in the guiding position.

Preferably, the wheels are mounted to the seat housing near the seat and seat backrest joint.

Preferably, the wheels are provided with bearings.

Preferably, the wheels are mounted in the housing in a snap-on manner, preferably each of them separately.

Preferably, the wheels share the single common rotation axle.

Preferably, the wheels are located on a common axle with a differential, each wheel being connected to the axle with the homokinetic joint and the axle being provided with a wheel-turning mechanism connected to the handle and/or the grip.

Preferably, the handle is rotatably mounted to the car seat, while inside the handle there are the elements provided for connecting the rotating grip with a wheel-turning mechanism.

Preferably, the handle is mounted closer to the right or left side of the car seat.

Preferably, the child car seat is additionally equipped with a wheel casing.

Preferably, the wheels are retractable into the housing of the car seat or into the wheel casing.

Preferably, the wheels have inflatable tires.

Preferably, the handle is a single-piece element.

In another preferred embodiment, the handle is combined of at least two separate segments assembled together.

Preferably, the part (b) of the handle is unbent and of adjustable length, such as telescopic.

BRIEF DESCRIPTION OF DRAWINGS

The invention will now be further illustrated in the preferred embodiment, with reference to the accompanying drawings, in which.

PREFERRED EMBODIMENTS OF THE INVENTION

Figure 1:
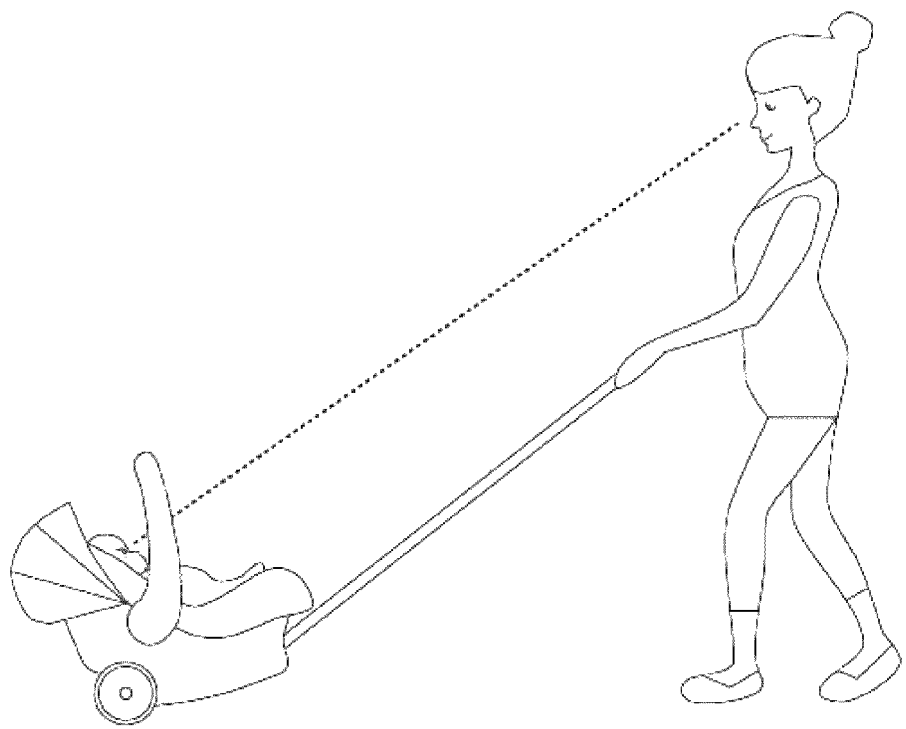
FIG. 1 schematically illustrates the present invention in a preferred embodiment, in normal use, wherein the mother guiding the seat according to the invention and the child seated therein have visual contact.
Figure 2:
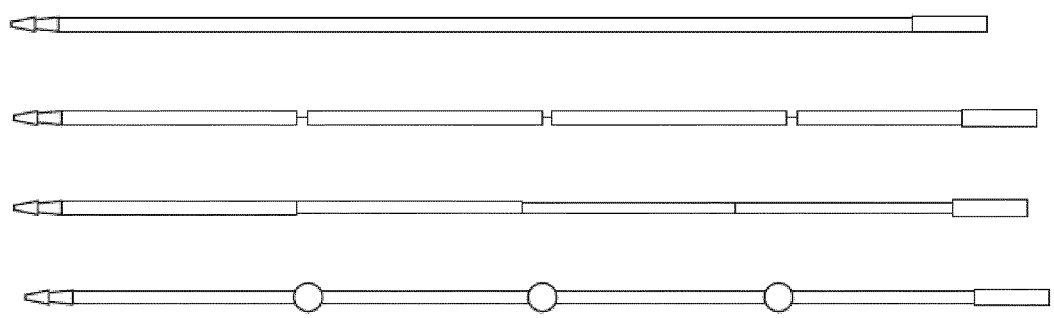
FIG. 2 shows various examples of handle types, which a seat can be provided with according to the present invention (from the top to the bottom: a straight, uniform handle, preferably made of one piece of material; folding handle made of several segments, connected by a spring line placed inside, folding telescopic handle, folding unscrewing handle, handle extended from the inside of the car seat housing, similarly as in the suitcases; each of example handles is provided with a grip)
Figure 3:
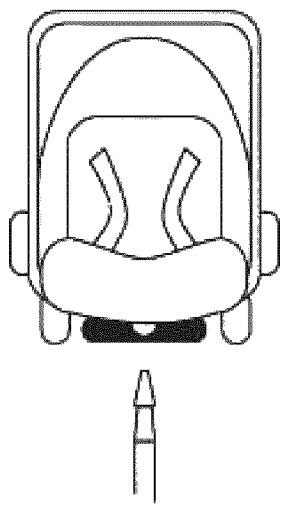
FIG. 3 shows a diagram of mounting the handle to the car seat in the embodiment of the invention shown in FIG. 1.

A child car seat is a well-known and necessary piece of equipment for a child while travelling. For easy and convenient transport of the car seat and the child, according to the invention, the car seat is provided with inflatable wheels mounted on the axle around which they can rotate, the axle extending at least partially through the car seat housing. In the first aspect of the invention, the car seat housing is a part of the car seat that surrounds the backrest and seat of the car seat. The wheels may be attached to the housing independently of each other (e.g. by a snap-on/click) and preferably with a bearing or may be attached to a common axle (preferably also with bearings). The wheels can be retracted in the car seat housing. Preferably, the wheels are attached to the car seat housing at the car seat and seat backrest joint or near that place. The wheels and the axis may additionally be provided with a mechanism enabling the wheels to turn left or right. In this case, the mechanism is controlled by a grip, which is rotatably connected to the handle, with the grip shape allowing comfortable and precise control of the movement of the car seat, including—precise guiding of the car seat. The wheel-turning mechanism by turning the handle/grip along the axis is analogous to the mechanism of turning the wheels in the car.

In one embodiment of the invention, the car seat is provided with a straight handle, of non-adjustable length and coaxially connected to the handle. The handle is snap-on connected to the seat. In addition to or instead of such a connection the handle may be connected to the seat otherwise—e.g. using a thread, bolted with a screw etc. In each case, the handle is attached to the seat from the bottom, from the side further from the backrest, and is directed in this direction (i.e further away from the backrest—to the position where the child, seated correctly in the car seat, would look). Because the centre of gravity of the device (both empty and with a child seated in the car seat) is located between the grip and the rotation axle of the wheels, the car seat is stable, and guiding is smooth. Ergonomic shape of the handle and the adjustable handle length allow to maintain comfortable posture of the parent or another person guiding the stroller, regardless of her/his height. Since the handle is attached to the seat away from the backrest and the handle is directed away from the backrest, the face of the parent guiding the stroller is facing the child, so the visual contact with the child is provided. Thereby, a child has a greater sense of safety and it is possible to establish a closer emotional bond between the child and the parent.

It is possible to modify shape of both the grip and the handle. The shape of the handle may be curved, i.e. it may have curves, e.g. be S-shaped, which would allow the distance between the parent and the child to be reduced. Furthermore, the S-shape can allow the lower part of the handle to be a support against the ground without having to rest the entire handle with the grip while leaving the handle at a height that makes it easy for the parent to grab it again, as well as to ensure the comfort of guiding and maintaining the correct posture of the person guiding the car seat.

Moreover, the handle can have adjustable length, i.e. folding, sliding, telescopic or made up of several tubular parts connected by a elastic cord, which allows people of various heights to guide the car seat, while adjusting the position of the car seat to the ground (angle of inclination), allowing anatomically comfortable guidance of the car seat. The material of the handle according to one embodiment is wood, but it is equally possible to use a handle made of other materials such as metal, e.g. aluminium or plastics. The grip can be made of other materials, such as wood, rubber, plastics such as specially hardened foam or other with non-slip properties. The shape of the grip can be straight, without grooves, or adjusted to the shape of the palm when it correctly covers the grip, i.e. with grooves that imitate the shape of the fingers and the inside of the palm, and suggesting the correct grip as in the grips/handles of the handlebars in the bicycle steering wheel. The grip may also be bent beyond the handle axis, e.g. towards the ground or to the side, thereby changing the position of the hand and wrist while guiding the car seat.

In another embodiment of the invention, the handle can be attached, e.g. snap-on to a car seat attachment in the base of the seat on the right and/or left of the car seat. This embodiment changes the position of the parent relative to the car seat so that it is in line with the car seat and reduces the width of the track of the guiding person and the car seat. Then, the hand grabbing the grip may be on the side of the torso and does not need to be stretched out. Choosing the fixing side can be important for left-handed people.

Yet another exemplary embodiment of the invention the cambered handle consists of three parts: part (a) which is mounted to the car seat housing, part (b) which is the longest and unbent part of the handle and part (c) forming the grip of the handle, wherein (a) is connected to (c) via (b), is movable between three end positions in which it can be blocked: the guiding position, the tucked position and a shoulder position, wherein in the shoulder position part (b) of the handle is located in front of the user, so that part (c)

surrounds the user's arm from the back to the front. This embodiment has been shown in figures in two alternative aspects:

(i) with the cambered handle movably mounted to bottom part of the housing below the seat, further away from the backrest and directed in this direction (FIGS. 6-8 and 12);

(ii) with the cambered handle movably mounted to the part of the housing behind the backrest and directed in this direction (FIGS. 9-11 and 13).

Moreover, the handle is cambered in a shape adjusted to the shape of the housing of the car seat, so that in the tucked position it does not stand out from the car seat and thus cause inconvenience or danger in the car.

Figure 14:
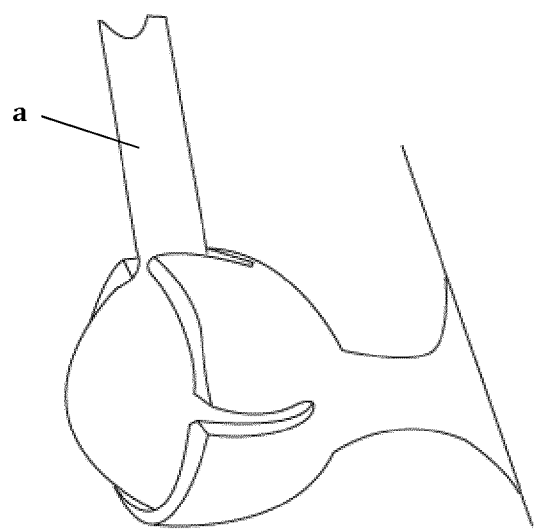
FIG. 14 shows a ball joint forming a movable connection between the handle and the bottom part of the housing in a preferred aspect of embodiment of FIG. 6.
Figure 15:
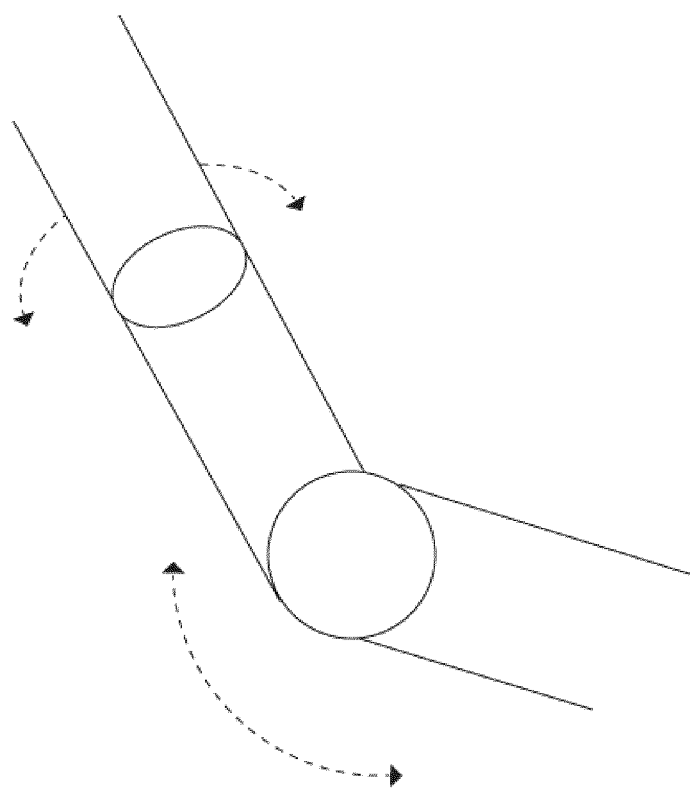
FIG. 15 shows another preferred aspect of the of embodiment of FIG. 6, wherein the handle is movably mounted to the bottom part of the housing below the seat, further away from the backrest, by means of a rod-shaped intermediate element comprising two hinged connections on its both ends, one end being hingedly connected to the car seat housing and the other end being hingedly connected to the handle, whereby the rotation axis the two hinged connections are perpendicular to each other.
Figure 16:
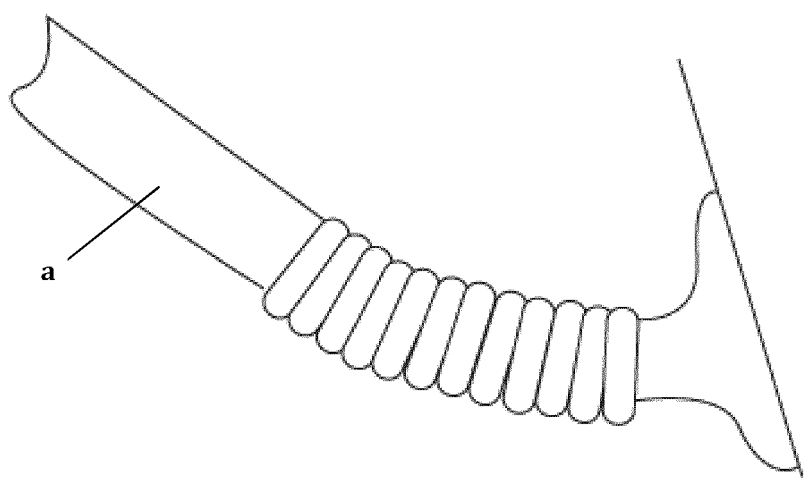
FIG. 16 shows yet another preferred aspect of the of embodiment of FIG. 6, wherein the handle is movably mounted to the bottom part of the housing below the seat, further away from the backrest, by means of at least one connecting element fixed to the housing and connected to the handle by a flexible tubular portion.

In one preferred variant the handle movement between these three basic positions is possible due to a ball joint provided with a number of slits in the female part thereof corresponding to the number of end positions of the handle, and the handle is blocked in each of its end positions by being fixed in the corresponding slit of the ball joint female part (FIG. 14).

Figure 8:
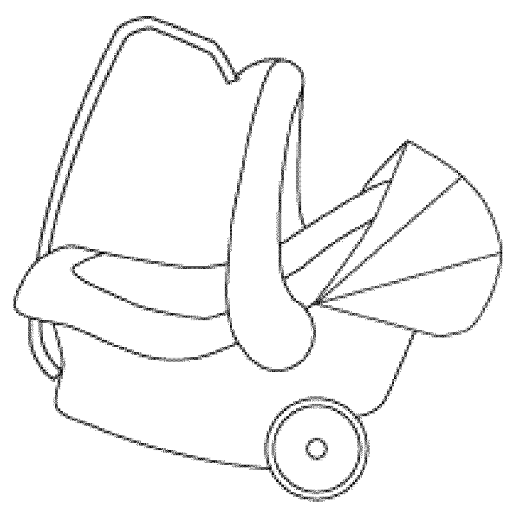
FIG. 8 shows the embodiment of the child car seat of FIG. 6, with the handle in its shoulder position.
Figure 11:
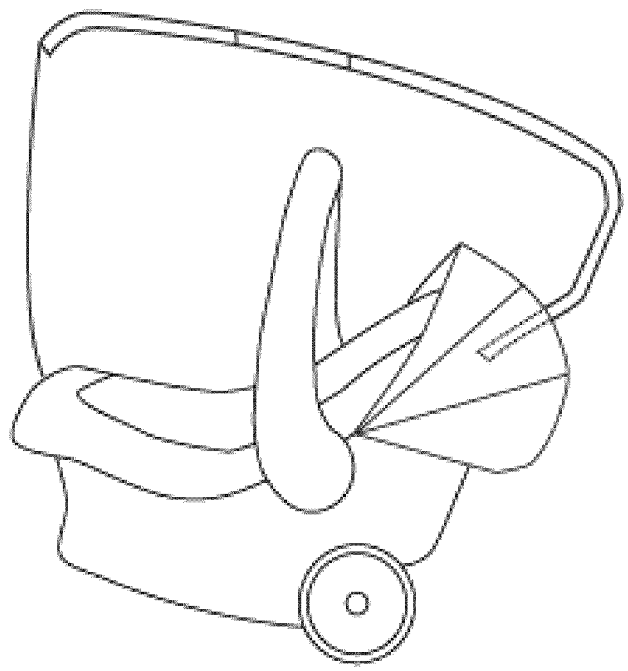
FIG. 11 shows the embodiment of the child car seat of FIG. 9, with the handle in its shoulder position.
Figure 12:
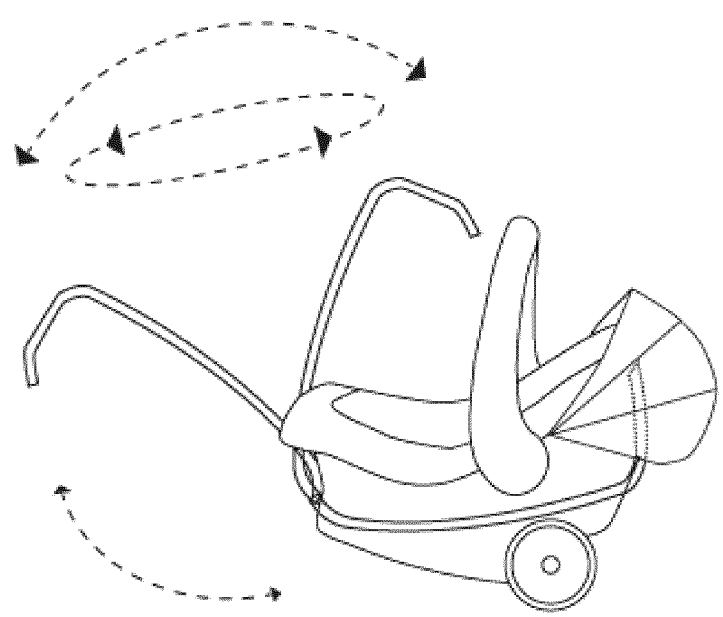
FIG. 12 shows the combinatory representation of all the three handle positions in the embodiment of the child seat of FIGS. 6-8, with the arrows showing the movement direction of the handle between each of the two positions.
Figure 13:
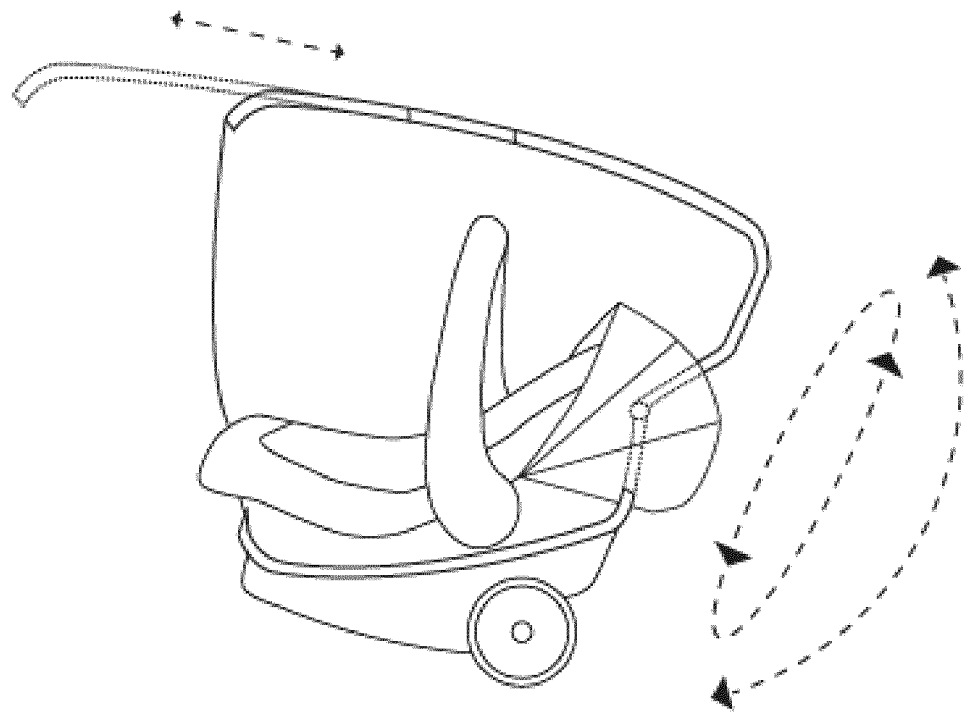
FIG. 13 shows the combinatory representation of all the three handle positions in the embodiment of the child seat of FIGS. 9-11, with the arrows showing the movement direction of the handle between each of the two positions.

In the shoulder position, shown in FIGS. 8 and 11 for aspects (i) and (ii), respectively, the cambered shape of the handle surrounds the user's arm, thus making the shoulder position comfortable for the user and safe for the child, which is particularly important while crossing hazardous or crowded areas.

Moreover, the possibility to quickly change between the three basic positions (guiding position, tucked position and shoulder position) makes the car seat according to the presently discussed embodiment of the invention a unique transportation device, which meeting most needs a parent and a child would have: in the tucked position it is a safe car seat, in the guiding position—a stroller, and in the shoulder position—a baby carrier, which is more comfortable for a parent than a usual carrier, because one does not have to grab it with one's hand and hold it like a bag or a basket, but hang it on one's shoulder, making it easier to move in a crowd and protecting the child. A usual baby carrier typically hangs on a height of a knee where the child in the carrier can be unintentionally shaken or bothered. The closer contact with the parent improves the child's sense of security and allows to maintains the visual contact with the parent.

Figure 6:
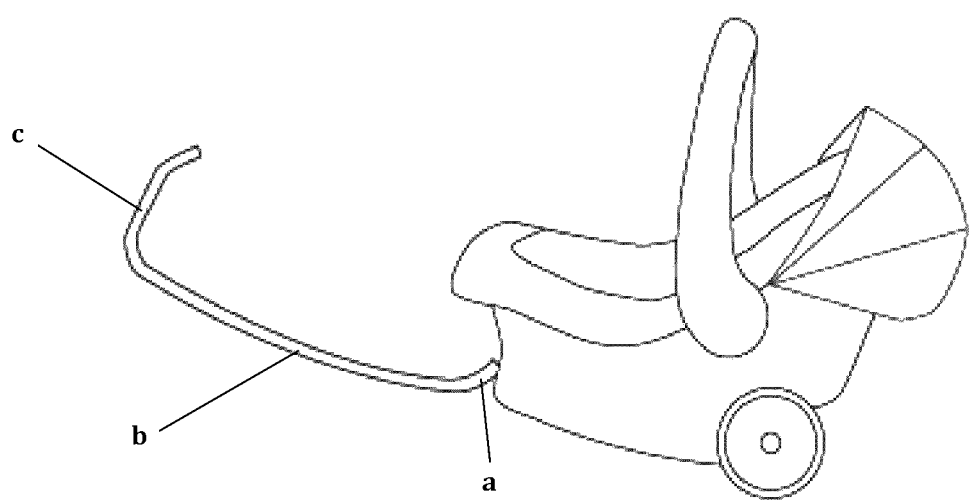
FIG. 6 shows another embodiment of the child car seat according to the invention, namely having a cambered handle movably mounted to the bottom part of the housing below the seat, further away from the backrest and directed in this direction, wherein the handle is in a guiding position.
Figure 7:
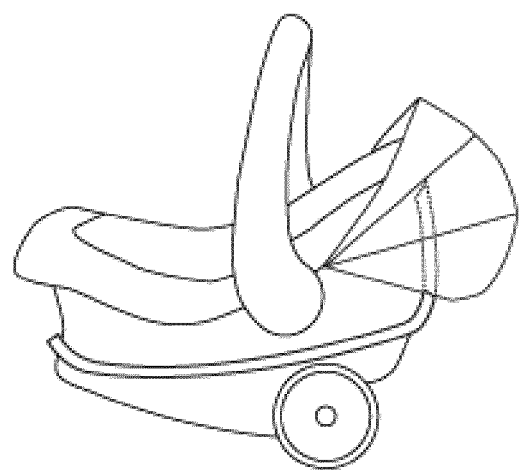
FIG. 7 shows the embodiment of the child car seat of FIG. 6, with the handle in its tucked position.
Figure 9:
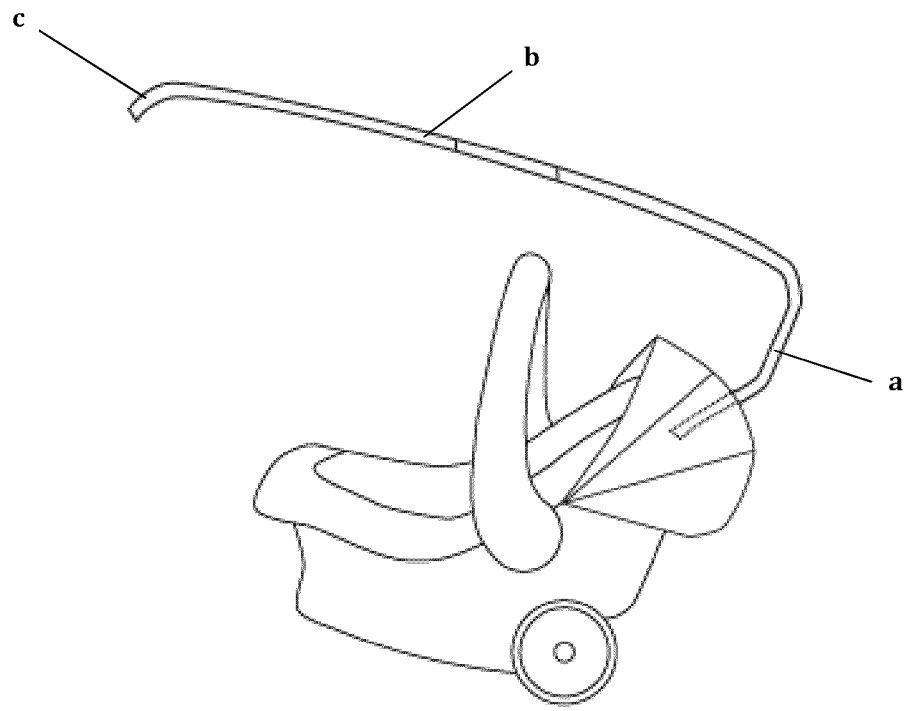
FIG. 9 shows another embodiment of the child car seat according to the invention, namely having a cambered handle movably mounted or to the part of the housing behind the backrest and directed in this direction, wherein its telescopic handle is in its guiding position.
Figure 10:
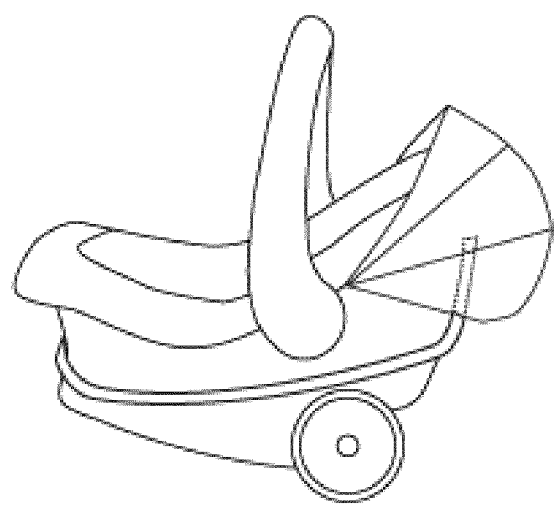
FIG. 10 shows the embodiment of the child car seat of FIG. 9, with the handle in its tucked position.

In a preferred embodiment of the invention, part (c) constitutes entirely or partially the grip of the handle (shown e.g. in FIGS. 6 and 9 for aspects (i) and (ii), respectively). The grip portion can be replaced by a handle modification, e.g., by appropriate grooving its upper portion or covering it with another material, e.g. tape or by creating anti-slip tabs on the gripping surface of e.g. made of rubber. The grip portion or simply the end of part (c) of the handle, is provided by a band or a latch, preferably equipped with a hook. In the shoulder position of the aspect (i) (FIG. 8), the grip is connected via said band/latch ended with a hook to a hoop handle extending over the child car seat from one lateral side to the other. In case of shoulder position of the aspect (ii) (FIG. 11) the grip is connected via said band/latch ended with a hook to a customary corresponding element (such as a ring or an eyelet) arranged on the rear wall of the backrest. In the tucked position (shown e.g. in FIGS. 7 and 10 for aspects (i) and (ii), respectively) the grip is releasably engaged in a corresponding element provided at the outside housing surface at a location corresponding to the position of the free end of the handle (=the grip) in the tucked position.

In another preferred embodiment of the invention, the car seat is equipped with an additional fixing element adjusted to receive the part (a) of the movable handle. The fixing element is located near the element mounting the handle to the car seat, and serves to releasably block the handle in the guiding position.

In a preferred embodiment the unbent part (b) of the handle is of adjustable length, e.g. is telescopic (see FIGS. 11 and 13), which allows in particular to easily switch between the short form of the handle useful in the tucked position (FIG. 10) and the long form of the handle useful in the guiding position (FIG. 9).

Figure 4:
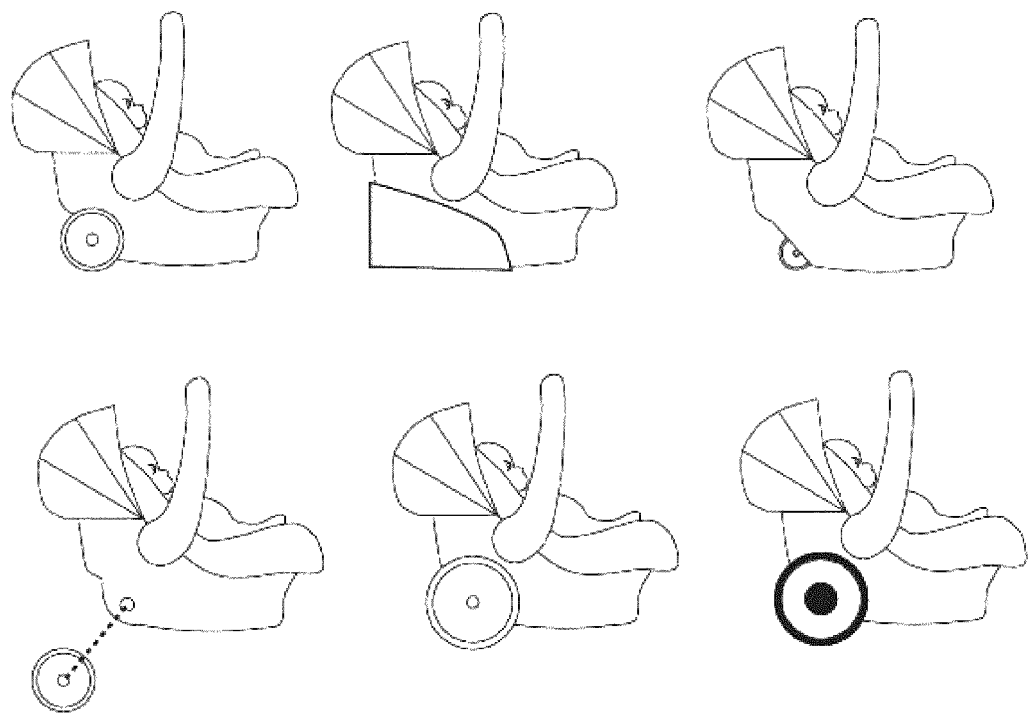
FIG. 4 shows various examples of wheels, which the child car seat can be provided with according to the present invention (from the top to the bottom and from left to right: soft, hard, with an inner tube)

One of the embodiments of the child car seat according to the invention shown in FIG. 4 has wheels permanently attached to the bottom of the car seat housing. In this case the wheels are mounted on hubs arranged through the tabs of the car seat housing. The common axle connecting two wheels goes through the hubs. Preferably, the axle is also provided with a differential for comfortable and precise turning of the car seat to the right or left.

In addition to being arranged on a common axle the wheels can be placed on a foldable element that allows them to be folded and retracted between the tabs under the base of the car seat housing. In another variant the wheels can be placed on the respective element and folded on the outside of the tabs. It is also possible to mount the wheel folding mechanism in the cavity in the base of the housing and to lock the wheels inside the car seat housing. In the embodiment of the invention illustrated on FIG. 4 the wheels are not retractable, and the car seat structure may include an accessory in the form of a wheel casing. Retracting the wheels between the housing base tabs, to the inside of the housing, in the housing, and other ways of retracting the wheels (see FIG. 5), protects them from damage while carrying the car seat, and protects the upholstery of the car against dirt. The car seat can have two or more wheels. In accordance with the basic embodiment of the invention, a car seat has two non-inflatable and non-retractable wheels.

Various wheel types for strollers can be used in the design of the seat according to the invention. They may have rims, they can be formed uniformly or with holes, made of metal, plastic, wood etc., or they can have spokes e.g. made of steel. Tread on the tire can be made of rubber or plastic, such as polyurethane. Another option is the use of inflatable wheels made of, for example, rubber. According to the proposed embodiment of the invention, the wheels have rims with plastic holes and are not inflatable. Depending on the embodiment of the invention, the person skilled in the art will select the type of wheels suitable for the car seat structure in terms of mechanical strength, size and weight.

The design of the seat is perfect for travelling for example by car or plane. Due to the preferred modification of the invention consisting in equipping the car seat with a wheel-retracting mechanism and a handle snap-on connected with the seat, it is possible to quick and easy place and remove the seat from the back seat of the car or aeroplane seat. Additionally, the design of such modified car seat makes child transport easy and safe, for example, when moving around the airport or other crowded areas.

Figure 5:
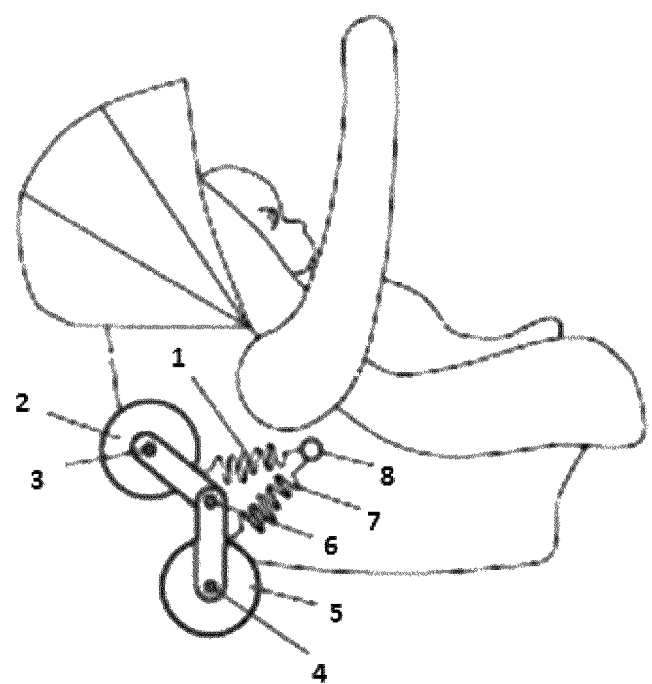
FIG. 5 shows another way of attaching the wheels in which the tension springs are used.

Wheels attachment method shown in FIG. 5 concerns at least two wheels mounted in one of the aforementioned methods, consisting in that the wheels can be further retracted for mounting e.g. in the car and put down for riding. The system includes at least one spring (1, 7) attached to the car seat housing by means of a fastening element (8) enabling the spring (1, 7) to rotate about an axis parallel to the common axle of the wheels. An exemplary fastening element may be a screw or pin with a notch onto which a loop is applied on which the end of the spring is attached. In another embodiment, the screw or pin is retracted into the recess of the car seat and does not extend beyond the car seat housing.

In the embodiment shown in FIG. 5, the wheels (2, 5) are not attached directly to the car seat housing, but via swing arms. The swing arms are to be understood as the elongated metal or plastics elements that are fixed to the housing (6) with one end in a rotatable manner and the wheels are attached to the second end (3 or 4), and between the attachment of the wheels and the attachment of the swing arm to the housing (6), on the swing arm there is an attachment of the other end of the spring. The use of swing arms allows the wheels to be slightly offset from the car seat structure so that the wheels (2, 5) do not rub against the housing while moving. Additionally, the swing arm rests on the housing in one of the two possible positions: retraction position (when the wheels are retracted) and riding position (when the wheels are in a riding position, i.e. the arrangement of the car seat system in which the wheels (2) extend towards the ground and the spring(s) (7) press(es) the swing arm (3) substantially against the bottom of the base of the car seat). In the retracted position the springs (7) press the swing arms (4) against the rear of the car seat housing so that the wheels (5) are partially retracted at the rear of the car seat and it is not possible to guide the car seat on the wheels (5) on the ground.

Preferably, the swing arms are attached to the car seat housing at the car seat backrest, symmetrically on both sides of the car seat.

The springs should preferably have a tension suitable for securely locking the wheels in one of two positions, but the tension cannot be too high, e.g above 200 N, as this would make it difficult to change the position of the wheels, especially for pregnant women and elderly people.

A wheel casing may extend and retract inside the car seat housing.

One-handed guiding of the car seat allows to use the other hand at the same time for numerous other activities, e.g. to open the door, use a mobile phone, carry a suitcase, keep a dog on a leash or keep another child.

The invention claimed is:

1. A child car seat comprising a housing surrounding a backrest and a seat, and a handle for guiding the car seat, the child car seat comprising:
   a) at least two wheels, each of them being mounted on an axle around which it can rotate, the axle extending at least partly through the car seat housing,
   b) the handle is elongated, mounted with one of its ends to the car seat, and provided at its another, free end with a grip for pushing the car seat in front of oneself on the ground,
   the handle being configured and located relative to the axle so that in normal use the centre of gravity of the car seat with a handle is located between the grip and the axle,
   whereby the handle is mounted to the car seat housing, either to the bottom part of the housing below the seat, further away from the backrest and directed in this direction, or to the part of the housing behind the backrest and directed in this direction, characterised in that the handle is formed as a single stick-shaped element and is mounted to the seat of the car seat, from below, further away from the backrest and directed in this direction.

2. A child car seat comprising a housing surrounding a backrest and a seat, and a handle for guiding the car seat, the child car seat comprising:
   a) at least two wheels, each of them being mounted on an axle around which it can rotate, the axle extending at least partly through the car seat housing,
   b) the handle is elongated, mounted with one of its ends to the car seat, and provided at its another, free end with a grip for pushing the car seat in front of oneself on the ground,
   the handle being configured and located relative to the axle so that in normal use the centre of gravity of the car seat with a handle is located between the grip and the axle,
   whereby the handle is mounted to the car seat housing, either to the bottom part of the housing below the seat, further away from the backrest and directed in this direction, or to the part of the housing behind the backrest and directed in this direction, characterised in that the handle is movably mounted to the car seat housing, either to the bottom part of the housing below the seat, further away from the backrest and directed in this direction, or to the part of the housing behind the backrest and directed in this direction; and
   the handle is cambered and shaped to essentially correspond to a lateral side of the child seat; and
   the handle is movable between at least two end positions, in which it can be blocked:
   a guiding position, wherein the handle extends substantially perpendicular to the axis around which the wheels can rotate
   a tucked position, wherein the handle essentially surrounds one of the lateral sides of the child seat and at least partially the rear walls of the backrest of the seat.

3. The child car seat according to claim 2, wherein the handle, consisting of three parts:
   a first part (a) which is mounted to the car seat housing,
   a second part (b) which is the longest and unbent part of the handle and
   a third part (c) forming the grip of the handle, wherein the first part (a) is connected to the third part (c) via the second part (b),
   is movable between three end positions in which it can be blocked: the guiding position, the tucked position and a shoulder position, wherein in the shoulder position the second part (b) of the handle is located in front of the user, so that the third part (c) surrounds the user's arm from the back to the front.

4. The child car seat according to claim 3, wherein in the shoulder position the user is facing the child and is able to surround the lateral side of the car seat with her/his arm.

5. The child car seat according to claim 2, wherein the third part (c) of the handle is directed downwards.

6. The child car seat according to any of the claim 2, wherein the handle is movably mounted to the car seat housing by means of a ball joint, and preferably the ball joint is arranged under the seat from the side farther away from the backrest or under the backrest.

7. The child car seat according to claim 6, wherein the handle is movable from one of the end positions to another by being rotated around the longitudinal axis of the handle and around the rotation axis of the ball joint.

8. The child car seat according to claim 6, wherein the ball joint is provided with a number of slits in the female part thereof corresponding to the number of end positions of the handle, and the handle is blocked in each of its end positions by being fixed in the corresponding slit of the ball joint female part.

9. The child car seat according to claim 2, wherein the handle is movably mounted to the bottom part of the housing below the seat, further away from the backrest, by means of a rod-shaped intermediate element comprising two hinged connections on its both ends, one end being hingedly connected to the car seat housing and the other end being hingedly connected to the handle, whereby the rotation axis the two hinged connections are perpendicular to each other.

10. The child car seat according to claim 2, wherein the handle is movably mounted to the bottom part of the housing below the seat, further away from the backrest, by means of at least one connecting element fixed to the housing and connected to the handle by a flexible tubular portion.

11. The child car seat according to claim 2, wherein the third part (c) of the handle is provided with a short band, preferably equipped with a hook, wherein the hook is adjusted to engage a ring or other corresponding element arranged on the rear wall of the backrest, thereby blocking the handle in the tucked and shoulder positions, and the car seat is equipped with an element adjusted to receive the handle in the first part (a) and located near the element mounting the handle to the car seat, to block the handle in the guiding position.

12. The child car seat according to claim 2, wherein the wheels are located on a common axle with a differential, each wheel being connected to the axle with the homokinetic joint and the axle being provided with a wheel-turning mechanism connected to the handle and/or the grip.

13. The child car seat according to claim 12, wherein the handle is rotatably mounted to the car seat, while inside the handle there are the elements provided for connecting the rotating grip with a wheel-turning mechanism.

14. The car seat according to claim 2, wherein the handle is combined of at least two separate segments assembled together.

15. The car seat according to claim 14, wherein the second part (b) of the handle is unbent and of adjustable length, such as telescopic.

* * * * *